US006751935B2

(12) United States Patent  (10) Patent No.: US 6,751,935 B2
Brenkus  (45) Date of Patent: Jun. 22, 2004

(54) METHOD AND APPARATUS FOR DETECTING UNIQUE ITEMS DURING INSERTION INTO A PRODUCT PACKAGING SYSTEM

(75) Inventor: Frank Mathew Brenkus, McKinney, TX (US)

(73) Assignee: Frito-Lay North America, Inc., Plano, TX (US)

( * ) Notice: Subject to any disclaimer, the term of this patent is extended or adjusted under 35 U.S.C. 154(b) by 5 days.

(21) Appl. No.: 09/978,975

(22) Filed: Oct. 15, 2001

(65) Prior Publication Data

US 2003/0070401 A1 Apr. 17, 2003

(51) Int. Cl.[7] ............................................. B65B 1/30
(52) U.S. Cl. ..................... 53/493; 53/284.3; 53/460; 53/473; 53/569
(58) Field of Search .............................. 53/284.3, 460, 53/473, 493, 569, 54

(56) References Cited

U.S. PATENT DOCUMENTS

| | | | | |
|---|---|---|---|---|
| 4,429,217 A | * | 1/1984 | Hill et al. | 235/380 |
| 4,678,994 A | * | 7/1987 | Davies | 324/236 |
| 4,726,171 A | | 2/1988 | Kreager et al. | |
| 4,962,623 A | * | 10/1990 | Francisco | 53/54 |
| 5,045,789 A | | 9/1991 | Inoue et al. | |
| 5,220,770 A | * | 6/1993 | Szewczyk et al. | 53/493 |
| 5,444,526 A | * | 8/1995 | Echapare Ibarrola et al. | 356/71 |
| 5,549,233 A | | 8/1996 | Clauser | |
| 5,572,121 A | | 11/1996 | Beswick | |
| 5,661,552 A | | 8/1997 | Nishigai | |
| 5,745,540 A | * | 4/1998 | Okada et al. | 377/8 |
| 5,785,224 A | * | 7/1998 | Nowakowski | 225/4 |
| 5,845,462 A | | 12/1998 | Kuehl et al. | |
| 5,907,944 A | | 6/1999 | Giacoman | |
| 5,941,053 A | * | 8/1999 | Kotsiopoulos | 53/435 |
| 5,994,897 A | | 11/1999 | King | |
| 6,035,610 A | | 3/2000 | Vonderhorst et al. | |

* cited by examiner

Primary Examiner—Stephen F. Gerrity
Assistant Examiner—Hemant M. Desai
(74) Attorney, Agent, or Firm—Colin P. Cahoon; Vincent J. Allen; Carstens, Yee & Cahoon, LLP

(57) ABSTRACT

A novel method and apparatus of detecting unique items as they are inserted into a product packaging system that is easily adaptable to current product packaging and prize insertion systems. A number of different types of sensors may be used in conjunction with the insertion device to detect the unique prize before it is inserted into a product packaging system. The sensor used will vary depending on the particular application. Sensors that may be used include a capacitive proximity sensor, a thickness sensor, a reflectivity sensor, a transmissivity sensor, a stiffness sensor, a color sensor, or even an odor or chemical sensor. Ideally, the type sensor used will detect a feature of the unique item that is easily distinguishable from other items being inserted. Once the sensor detects the prize and generates a signal, this signal can be used to perform a variety of useful functions. In one embodiment of the invention, the signal is used to control a foreign matter detector (FMD) during the insertion of unique prizes that would ordinarily trigger the FMD. After detecting the unique prize, the controller for the insertion device shuts down the FMD for a predetermined period of time to allow the unique prize to pass through without triggering the FMD. The controller may also increase a counter each time one of the unique prizes is detected to keep track of the number of unique prizes inserted. Once the unique prize passes through, the FMD is turned back on so that foreign objects may again be detected. The amount of time that the FMD is turned off is minimized.

41 Claims, 2 Drawing Sheets

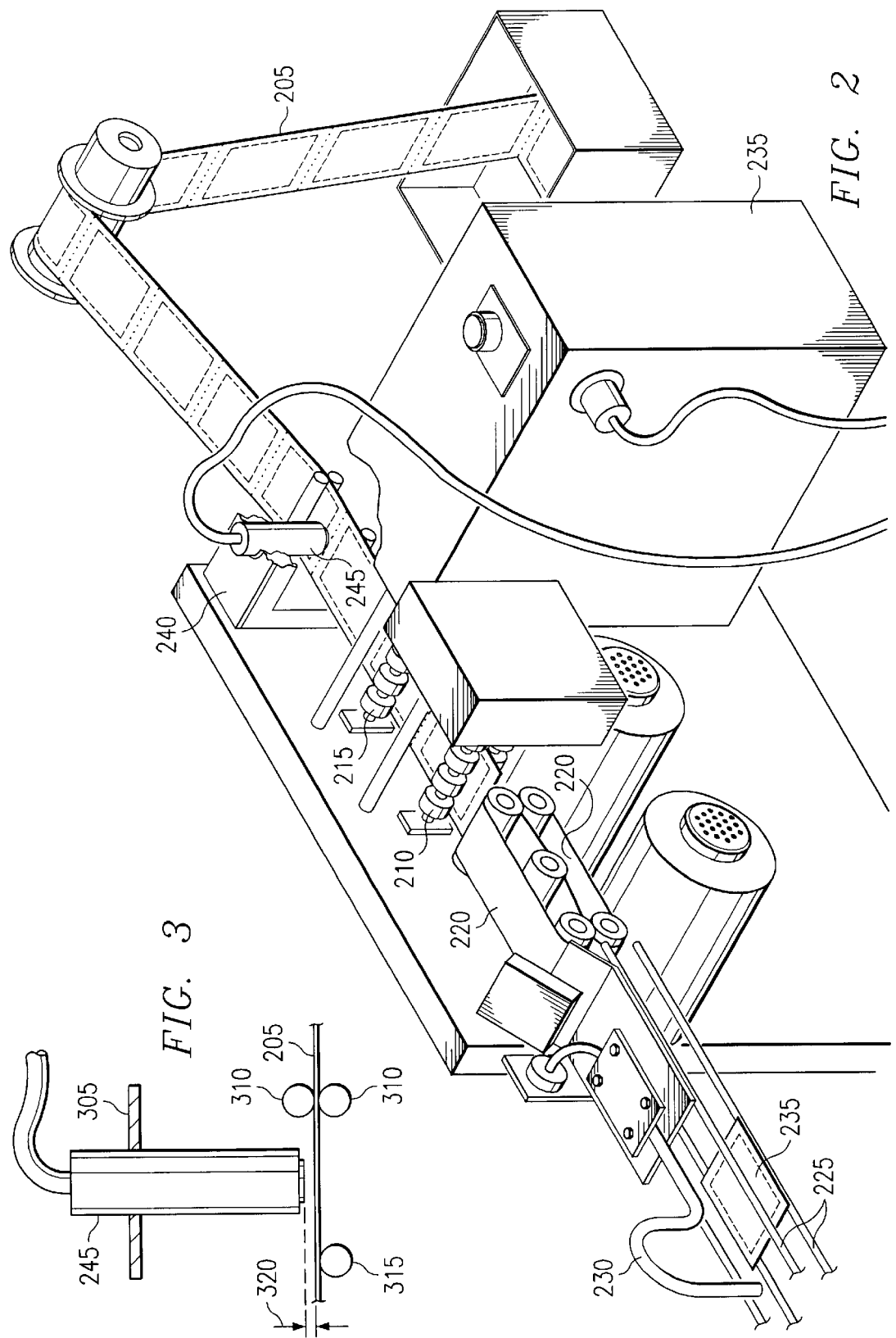

METHOD AND APPARATUS FOR DETECTING UNIQUE ITEMS DURING INSERTION INTO A PRODUCT PACKAGING SYSTEM

BACKGROUND OF THE INVENTION

1. Technical Field

The present invention relates to inserting articles such as coupons and prizes into product packages, and more particularly, to a method and apparatus for sensing unique items to be inserted into product packages.

2. Description of Related Art

Manufacturers of various snacks, candies, cereals, and other products often desire to place a prize or other object into the container during the packaging process. The terms "prize" and "coupon" as used herein include any type of insert, coupon, card, sheet, receipt, warranty, premium, cash, or other three dimensional novelty items that can be handled in accordance with the invention described herein. Similarly, the terms "container" and "package" are used in the broadest possible context to include containers such as boxes, tubs, cans, bags, and vessels of all kinds as well as other prize or coupon receiving means that can be used with the invention described herein. In the prior art, the prizes are typically formed in a bandolier and inserted into the packaging system using an insertion device. For example, the prizes may be formed as a continuous fold of coupons. The continuous fold contains a plurality of pouches that contain coupons and are perforated on each side to allow easy separation. A pair of breaking rollers are adapted to separate adjacent coupons. After the coupons are separated, the individual coupon is directed into the package prior to or during the package filling and sealing process. These coupons are most commonly used with food packages, but the present invention is not limited to food applications.

In one prior art system, the insertion device is placed just upstream of a foreign matter detector before the product is packaged. Product manufacturers often desire to run promotional campaigns in which various unique prizes are randomly placed into the product packages. One particular campaign that has been implemented is that of randomly inserting cash into the packages. In this campaign, a coupon is inserted into each bag with a coupon being randomly replaced with a note, such as a one dollar bill. Because cash has conductive properties it is a prize that is unique as compared to the coupons. A problem has arisen in that the foreign matter detector is activated every time cash passes through the foreign matter detector (FMD). Whenever the FMD is triggered, the system is typically shut down and the operator must determine the cause of the shut down. This substantially reduces the throughput of the system. Not only is the line shut down, but the employees that are operating the product line are aware of the package that contains the cash and may be tempted to remove the cash. One solution to this problem is to shut off the FMD so that it is not used whenever such a promotional campaign is in progress. However, the obvious problem with this solution is that it is not desirable to shut down the FMD because foreign matter may escape undetected until it reaches the final consumer of the product.

Another problem with the prior art systems is that there is no way to monitor the number of unique prizes that have been inserted. Thus, the batch of packages may be shipped to consumers with more or less than the desired amount of unique prizes inserted. For example, problems have arisen in a promotional campaign in which free cars were given away. Instead of inserting 50 unique coupons containing the free car prize, 500 unique coupons were inserted and it was not until consumers started claiming their free cars that the problem was recognized.

Although most systems sense the insertion of every prize or coupon by the insertion device simply to verify that the coupon or prize was inserted, there are no systems in the prior art that allow for distinguishing between the standard coupon or prize and a unique coupon or prize as they are being inserted by the insertion device. Therefore, there is a need for a system that allows cash or other unique prizes to be detected so that an appropriate action may be taken. For example, in promotional campaigns where unique prizes that normally trigger the FMD are randomly inserted into the packages, the system should allow detection of the unique prizes to allow an appropriate signal to be sent to the FMD rather than deactivating the FMD during the entire promotional campaign. The system should allow cash or other unique prizes to be inserted without triggering the FMD and causing the product line to be shut down. The system should provide assurance that foreign matter does not escape undetected. Also, the system should provide a means for detecting and counting the number of unique prizes inserted during a promotional campaign. Furthermore, the system should be easily adaptable to existing insertion devices in current product packaging systems.

SUMMARY OF THE INVENTION

The present invention provides for a novel insertion device that is able to detect unique prizes as they are inserted and is easily adaptable to current systems. A number of sensors may be used in conjunction with the inserter to detect the unique prize before it is inserted into a product packaging system. The sensor used will vary depending on the particular application. Sensors that may be used include a capacitive proximity sensor, an inductive proximity sensor, a thickness sensor, a reflectivity sensor, a transmissivity sensor, a stiffness sensor, a color sensor, or even an odor or chemical sensor. Ideally, the type sensor used will detect a feature of the unique prize that is easily distinguishable from other prizes or coupons being inserted. Once the sensor detects the prize and generates a signal, this signal can be used to perform a number of useful functions. In one embodiment of the invention, unique prizes that would ordinarily trigger the FMD are randomly inserted during a promotional campaign. The signal generated by the sensor is used to de-activate the FMD while the unique prizes pass through the FMD, thus allowing the FMD on the product line to remain in operation during the promotional campaign. Upon detecting a unique prize, a signal is sent to the controller for the insertion device to shut down the FMD for a pre-determined period of time to allow the prize to pass through without triggering the FMD. The controller may also increase a counter by one each time one of the unique prizes is detected to keep track of the number of unique prizes inserted. Once the unique prize passes through, the FMD is turned back on so that foreign objects may again be detected. The present invention minimizes the amount of time that the FMD is turned off.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings wherein:

FIG. 2 is a perspective view of a coupon inserter in accordance with an embodiment of the invention.

FIG. 3 is a cross-sectional view of a sensor assembly in accordance with an embodiment of the invention.

DETAILED DESCRIPTION

Figure 1:
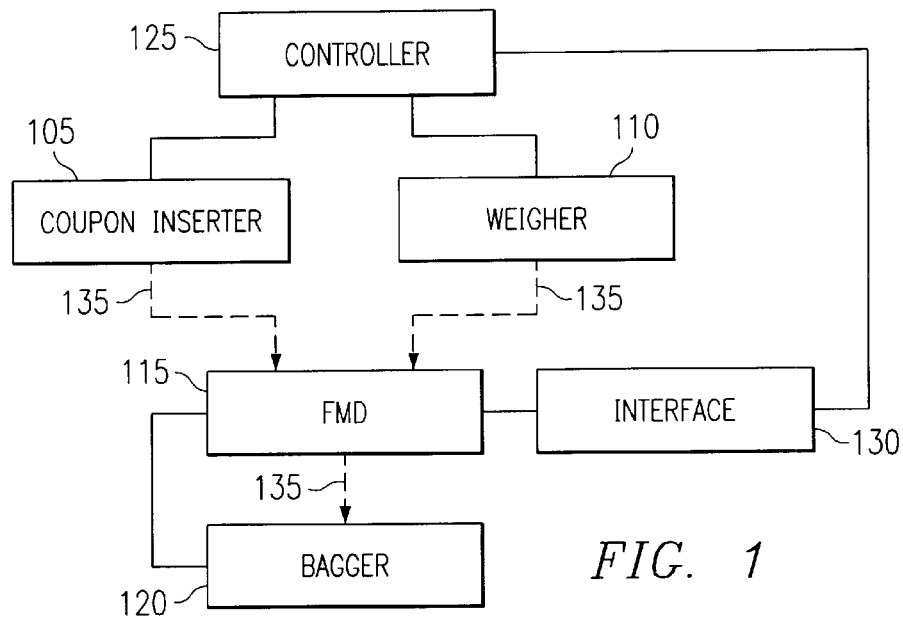
FIG. 1 is a block diagram of an embodiment of the invention.

Referring now to FIG. 1, a block diagram of an embodiment of the present invention is illustrated. This embodiment of the invention may be used for a product packaging line such as that commonly used in the art for packaging potato chips or other snack foods, but is not limited to any particular type of packaging line or product. For example, pharmaceuticals, confectionary items, personal care products, pet foods, breakfast cereals, and other products may be packaged using the method and apparatus of the present invention. Product flow is indicated in FIG. 1 by the dashed arrows 135. A coupon inserter 105 is placed adjacent to a product weigher 110 such that the coupons are inserted into the product flow as the product flows from the weigher 110. When a coupon or prize is discharged from the coupon inserter 105, it falls along with the product through the foreign matter detector 115 into the bagger 120 where it is packaged and closed for shipment. A controller 125 is connected to the coupon inserter 105, the weigher 110, and the foreign matter detector (FMD) 115 through the interface 130. A sensor attached to the coupon inserter 105 is used to sense unique prizes to be inserted into a package. A metallized label may be attached to each unique prize to aid in sensing the unique prize. When a unique prize is sensed by the sensor, a signal is sent from the sensor to the controller 125 indicating that a unique prize is about to be inserted. The controller waits until all coupons in front of the unique prize are inserted. Once the unique prize is ready to be inserted into the weigher 110, the controller turns off the FMD 115 for a period of time that will allow the unique prize with the metallized label attached to pass clear of the FMD 115. The coupon inserter inserts the unique prize and the prize passes through the FMD 115 and into the bagger 120 without triggering the FMD 115 and shutting down the system.

Referring now to FIG. 2, a perspective view of the coupon inserter 105 of FIG. 1 in accordance with one embodiment of the present invention is illustrated. The coupons 205 to be inserted may be formed as a continuous fold as shown. Alternatively, the coupons may be formed as a reel of coupons, stacked sheets, or in any other manner consistent with the present invention. Two pairs of breaking rollers 210, 215 are adapted to separate adjacent coupons. Thereafter, the individual coupon is directed into the weigher at a high velocity by the discharge belts 220. The discharge belts 220 shoot a coupon out of the inserter and through the guide chute 225. A discharge eye 230 is used to determine when a coupon 235 is discharged. The discharge eye may be a photo cell in which a break in the light path emitted indicates that the coupon 235 has been discharged. The discharge eye 230 is connected to the controller 235. The sensor assembly 240 is also connected to the controller 235. The sensor 245 senses a metallized label that has been applied to a unique prize such as a one dollar bill randomly packaged in the coupon bandolier 205. A metallized label may be applied to any unique prize that would normally trigger the FMD so that the prize may be easily identified by the coupon inserter sensor 245. The metallized label allows a low-cost capacitive proximity sensor to be used to detect a unique prize with conductive properties such as cash that would not normally be detected by such a sensor although it would be detected by the more expensive and complex FMD 115.

Referring now to FIG. 3, a cross sectional view of the sensor assembly 240 of FIG. 2 in accordance with an embodiment of the present invention is illustrated. The sensor assembly shown may be easily adapted to fit current inserter devices used with food product packaging systems such as a vertical form, fill, and seal machine used for bagging potato chips. The bracket assembly 305 is attached to the frame of the coupon inserter to hold the sensor 245 in position. The coupons 205 pass through rollers 310 and over the top of roller 315 such that the coupons are maintained at a predetermined distance 320 from the capacitive proximity sensor 315. A suitable material for the bracket assembly is stainless steel. A suitable capacitive proximity sensor is the Omron model E2K-X8ME1. The capacitive proximity sensor senses a change in capacitance near the sensor caused by a change in conductivity as a unique prize passes in close proximity. The dimension requirements of the device depends on the feed speed of the inserter as well as the conductive properties of the unique prize. Lower conductivity and/or faster insertion speeds will require the coupons to be held closer to the capacitive proximity sensor than would higher conductivity and/or slower insertion speeds.

For unique prizes such as cash that are only slightly conductive, the change in capacitance caused by the prize is not great enough to be detected by the low-cost capacitive proximity sensor, thus requiring either an alternate means of activating the sensor, a more sensitive sensor or a different type of sensor. In one embodiment, a metallized label is attached to the unique cash prizes to allow the capacitive proximity sensor to detect the cash prize. Although the use of a metallized label is described herein as a means for allowing a low-cost capacitive proximity sensor to detect the unique prize, the invention is not limited to such means. Any conductive object that may be attached to the prize or packaged in the bandolier with the prize may be used without departing from the scope and spirit of the invention. Furthermore, sensors other than a capacitive proximity sensor may be use to detect unique prizes before they are inserted. An inductive proximity sensor could also be used to sense a change in inductance rather than a change in capacitance. Depending on the application, the sensors may or may not require a metallized label to be attached to the unique prize. For example, other sensors that may be used include a thickness sensor in which a mechanical roller is used to detect a change in thickness of the prize. Infrared or ultraviolet light emitting devices may also be used with a reflectivity sensor or a transmissivity sensor to detect the unique prizes. A stiffness sensor may also be used to detect changes in stiffness of the prizes that would identify the unique prize. Even color sensors and chemical sniffing devices or odor sensors could be used without departing from the scope and spirit of the invention.

Figure 4:
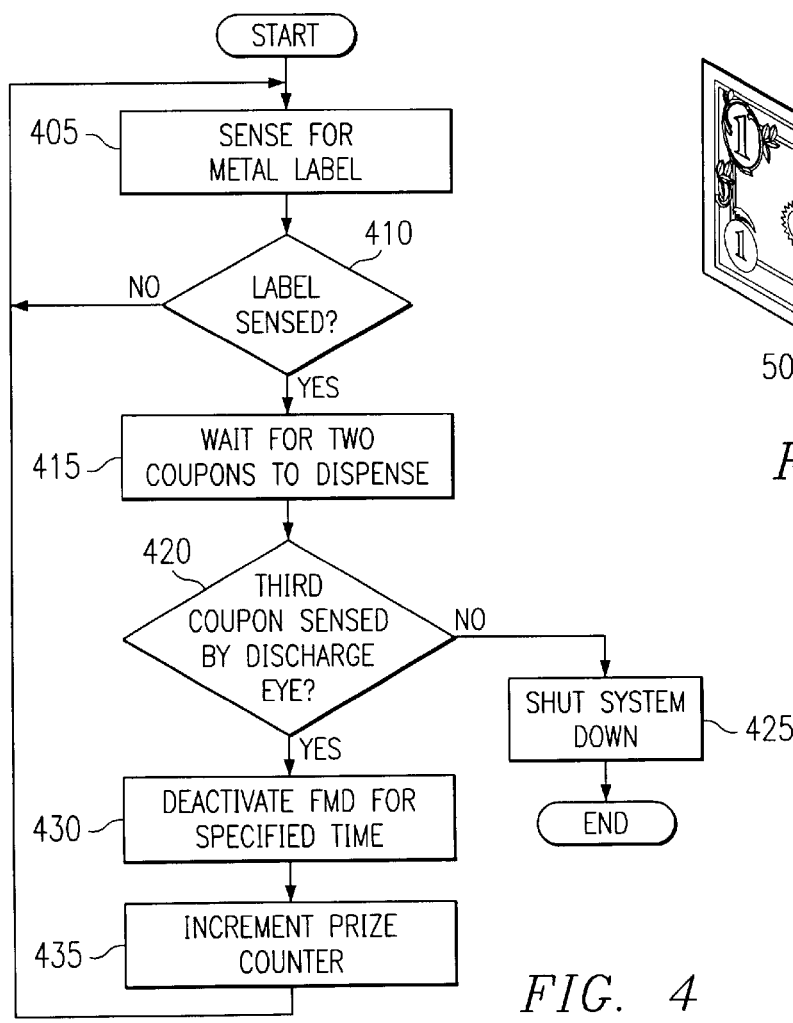
FIG. 4 is a flowchart of a method of using the invention in accordance with an embodiment of the invention.

Referring now to FIG. 4, a flow chart of an embodiment of a method used with the present invention is illustrated. Beginning at step 405 the unique prize sensor is monitored by the controller to determine when a unique prize passes by the sensor. This step is repeated until a unique prize is sensed at step 410. Once a unique prize is sensed at step 410, the controller waits for two coupons to dispense through the coupon inserter at step 415. The reason for waiting for two coupons to dispense is that in this embodiment there are three coupons ahead of the proximity sensor that have not yet been inserted. Therefore, the controller must wait until these have been inserted before it does anything else. Once the third coupon is sensed by the discharge eye at step 420, the FMD is deactivated for a predetermined period of time at step 430. This amount of time allows the prize to be dropped through the FMD while it is off. Because some residual magnetic field may remain behind in the FMD even after the prize passes through, the FMD must remain off until this field dissipates. The amount of time that the FMD is deactivated may be reduced or enlarged depending on the characteristics and sensitivity of the particular packaging system in which the invention is implemented. The predetermined time period may be easily determined at the plant in which the invention is implemented on a case by case basis and is typically around 2–4 seconds although the invention is not limited to this time period. After the predetermined period of time has elapsed, the FMD is activated once again. The unique prize counter is incremented at step 435 to keep track of the number of unique prizes that have been inserted. The inserter again begins to sense for a unique prize at step 405. If a coupon is not sensed at step 420, then there is a problem with the system and the system is shut down at step 425. This process repeats for the duration of the promotional campaign.

Figure 5:
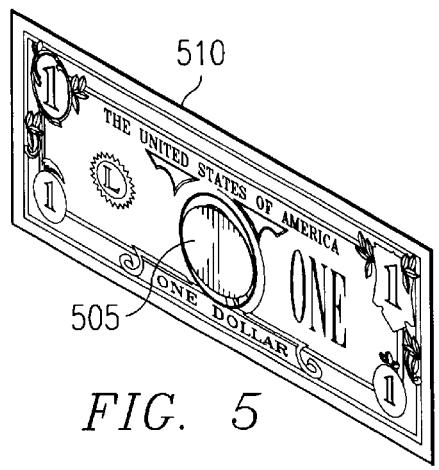
FIG. 5 is a perspective view of a one dollar bill in accordance with an embodiment of the invention.

Referring now to FIG. 5, a one dollar bill in accordance with an embodiment of the present invention is illustrated. A metallized label 505 is attached to the dollar bill to enable a low-cost capacitive proximity sensor to detect the unique cash prize. The metallized label 505 may be of the type that is easily removable so as not to damage the one dollar bill 510. The one dollar bill 510 may then be folded and packaged in a bandolier 205 along with other coupons as shown in FIG. 2.

The above described method and apparatus for randomly inserting a conductive prize into a product packaging system present novel and non-obvious features in the product packaging field. A coupon inserter is described that is capable of satisfying the several objects of this invention. However, this invention should not be construed to be limited to the specific construction elicited herein, but rather may be embodied in structures which change one or several of the disclosed features of the illustrated embodiment. For example, one with skill in the art would understand that there are numerous sensing means that could be used depending on the type of unique prizes to be inserted. Further, one with skill in the art would also understand that numerous other tasks can be performed when a unique prize is sensed other than counting and disabling a foreign matter detector. It should be understood that the invention is intended to cover all changes and modifications to the invention as depicted herein, and all other embodiments not specifically illustrated, which do not constitute a departure from the true spirit and scope of this invention.

What is claimed is:

1. An apparatus for identifying a unique object among a plurality of objects during the insertion of said unique object by an insertion device into a packaging system wherein said unique object is an object that is different from other objects within said plurality of objects, said apparatus comprising:

an insertion device for inserting said plurality of objects into said packaging system;

a sensor attached to said packaging system for detecting said unique object before said unique object is inserted into said packaging system by said insertion device, wherein said sensor distinguishes said unique object from said plurality of objects, wherein a signal is generated by said sensor for use by said packaging system when said unique object is detected, and wherein said signal is not generated when said other objects pass by said sensor; and a controller connected to said sensor for controlling a foreign matter detector, wherein responsive to said sensor detecting said unique object, said controller sends a signal to said foreign matter detector that deactivates said foreign matter detector while said unique object passes through said foreign matter detector, and wherein said controller sends a signal to said foreign matter detector that re-activates said foreign matter detector after said unique object passes through said foreign matter detector.

2. The apparatus of claim 1 wherein said plurality of objects comprises a plurality of prizes.

3. The apparatus of claim 2 wherein said sensor is a capacitive proximity sensor, said apparatus further comprising an assembly for holding said unique prize a predetermined distance from said capacitive proximity sensor as said unique prize passes by said capacitive proximity sensor.

4. The apparatus of claim 3 wherein said unique prize is randomly packaged in a bandolier of coupons such that each coupon in said bandolier to be inserted through said foreign matter detector passes through said assembly said predetermined distance from said capacitive proximity sensor before said coupon is inserted through said foreign matter detector and wherein said assembly comprises a plurality of rollers for positioning said coupon said predetermined distance from said capacitive proximity sensor.

5. The apparatus of claim 2 wherein said foreign matter detector is placed between a coupon inserter and a packaging device wherein said coupon inserter comprises said sensor and an insertion device for inserting said unique object into a flow of product.

6. The apparatus of claim 1 wherein said packaging system is a consumables packaging system.

7. The apparatus of claim 1 wherein said sensor is a capacitive proximity sensor, said apparatus further comprising an assembly for holding said unique object a predetermined distance from said capacitive proximity sensor as said unique object passes by said capacitive proximity sensor.

8. The apparatus of claim 7 wherein said unique object is randomly packaged in a bandolier of coupons such that each coupon in said bandolier to be inserted through said foreign matter detector passes through said assembly said predetermined distance from said capacitive proximity sensor before said coupon is inserted through said foreign matter detector and wherein said assembly comprises a plurality of rollers for positioning said coupon said predetermined distance from said capacitive proximity sensor.

9. The apparatus of claim 1 wherein said sensor is a sensor chosen from the group consisting of a capacitive proximity sensor, an inductive proximity sensor, a thickness sensor, a stiffness sensor, a color sensor, a reflectivity sensor, a transmissivity sensor, an odor sensor, and a chemical sensor.

10. The apparatus of claim 1 wherein said foreign matter detector is placed between a coupon inserter and a packaging device wherein said coupon inserter comprises said sensor and an insertion device for inserting said unique object into a flow of product.

11. The apparatus of claim 1 further comprising a counter for counting a plurality of said unique objects as they are inserted into said packaging system wherein said counter is incremented as each said unique object is inserted.

12. An apparatus for inserting a unique object into a packaging system utilizing a foreign matter detector, said apparatus comprising:
   a coupon inserter for inserting coupons into said packaging system at a location upstream from said foreign matter detector wherein said coupon inserter is adapted for inserting said unique object;
   a sensor assembly attached to said coupon inserter for detecting said unique object before said unique object is inserted into said packaging system; and
   a controller connected to a sensor in said sensor assembly for controlling said foreign matter detector, wherein responsive to said sensor detecting said unique object, said controller sends a deactivation signal to said foreign matter detector to turn off said foreign matter detector while said unique object passes through said foreign matter detector, and wherein said controller sends a re-activation signal to said foreign matter detector to turn on said foreign matter detector after said unique object passes through said foreign matter detector.

13. The apparatus of claim 12 wherein said coupon inserter comprises:
   a plurality of breaking rollers for separating a coupon from a bandolier of coupons;
   a plurality of discharge belts for inserting said coupon into said packaging system after said coupon is separated from said bandolier; and
   a discharge eye for sending a signal to said controller when said coupon is discharged from said coupon inserter.

14. The apparatus of claim 12 wherein said sensor comprises a capacitive proximity sensor for detecting a change in capacitance as said unique object passes by said sensor.

15. The apparatus of claim 14 wherein said sensor assembly further comprises a plurality of rollers for holding said unique object a predetermined distance from said capacitive proximity sensor as said unique object passes by said capacitive proximity sensor.

16. The apparatus of claim 15 wherein said unique object is randomly packaged in a bandolier of coupons such that each coupon in said bandolier to be inserted through said foreign matter detector passes through said sensor assembly said predetermined distance from said capacitive proximity sensor before said coupon is inserted through said foreign matter detector.

17. The apparatus of claim 14 wherein said unique object comprises a prize with a metallized label for triggering said capacitive proximity sensor.

18. The apparatus of claim 12 further comprising a counter for counting a plurality of said unique objects as they are inserted into said packaging system wherein said counter is incremented as each said unique object is inserted.

19. A method for detecting a unique object among a plurality of objects before inserting said unique object into a packaging system wherein said unique object is an object that is different from other objects within said plurality of objects, said method comprising the following steps:
   (a) sensing for a unique object to be inserted into said packaging system by an insertion device wherein said other objects within said plurality of objects are not sensed during said step of sensing; and
   (b) responsive to sensing said unique object during said step of sensing, generating a signal for use by said packaging system wherein said signal indicates that said unique object has been detected among said plurality of objects.

20. The method of claim 19 further comprising the following steps:
   (c) deactivating a foreign matter detector using said signal;
   (d) inserting said unique object into a product flow in said packaging system; and
   (e) re-activating said foreign matter detector after said unique object passes through said foreign matter detector.

21. The method of claim 20 wherein said unique object is randomly packaged in a bandolier of coupons such that each coupon in said bandolier to be inserted through said foreign matter detector passes a predetermined distance from a capacitive proximity sensor used to perform said step of sensing.

22. The method of claim 21 wherein said unique object comprises a cash bill having a metallized label attached for triggering said capacitive proximity sensor.

23. The method of claim 20 wherein said steps of deactivating and re-activating said foreign matter detector are performed using a controller connected to said foreign matter detector, a capacitive proximity sensor attached to a coupon inserter, and a discharge eye attached to said coupon inserter such that said capacitive proximity sensor and said discharge eye are used by said controller to determine when said unique object is inserted into said packaging system.

24. The method of claim 19 wherein said step of sensing is performed using a sensor chosen from the group consisting of a capacitive proximity sensor, an inductive proximity sensor, a thickness sensor, a stiffness sensor, a color sensor, a reflectivity sensor, a transmissivity sensor, an odor sensor, and a chemical sensor.

25. The method of claim 19 wherein said unique object comprises a prize and a metallized label for triggering a capacitive proximity sensor used to perform said step of sensing.

26. The method of claim 25 wherein said sensor comprises a roller assembly for holding said unique object a predetermined distance from said capacitive proximity sensor as said unique object passes by said capacitive proximity sensor.

27. The method of claim 19 further comprising the step of counting a plurality of said unique objects as they are inserted into said packaging system using a counter connected to said controller wherein said counter is incremented as each said unique object is inserted.

28. A method for tracking a number of random prizes inserted into a packaging system, said method comprising the following steps:
   (a) sensing for a random prize to be inserted into said packaging system;
   (b) responsive to a determination that said random prize is to be inserted during said step of sensing, incrementing a counter; and
   (c) inserting said random prize into a product flow in said packaging system.

29. The method of claim 28 wherein said step of sensing is performed using a capacitive proximity sensor that detects a change in capacitance as said random prize passes by said capacitive proximity sensor.

30. The method of claim 29 wherein said random prize comprises a metallized label for triggering said capacitive proximity sensor.

31. The method of claim 30 wherein said sensor comprises a roller assembly for holding said random prize a predetermined distance from said capacitive proximity sensor as said random prize passes by said capacitive proximity sensor.

32. The method of claim 28 wherein said random prize is randomly packaged in a bandolier of coupons such that each coupon in said bandolier to be inserted through said foreign matter detector passes a predetermined distance from a capacitive proximity sensor used to perform said step of sensing.

33. The method of claim 32 wherein said unique object comprises a cash bill having a metallized label attached for triggering said capacitive proximity sensor.

34. The method of claim 28 wherein said step of incrementing a counter is performed using a controller connected to a capacitive proximity sensor attached to a coupon inserter, and a discharge eye attached to said coupon inserter such that said capacitive proximity sensor and said discharge eye are used by said controller to determine when said unique object is inserted into said packaging system.

35. An apparatus for identifying a unique prize among a plurality of prizes during the insertion of said unique prize by an insertion device into a consumables packaging system wherein said unique prize is a prize that is different from other prizes within said plurality of prizes, said apparatus comprising:

an insertion device for inserting said plurality of prizes into said consumables packaging system;

a sensor attached to said consumables packaging system for detecting said unique prize before said unique prize is inserted into said packaging system by said insertion device, wherein said sensor distinguishes said unique prize from said plurality of prizes, wherein a signal is generated by said sensor for use by said consumables packaging system when said unique prize is detected, and wherein said signal is not generated when said other prizes pass by said sensor; and a controller connected to said sensor for controlling a foreign matter detector, wherein responsive to said sensor detecting said unique prize, said controller sends a signal to said foreign matter detector that deactivates said foreign matter detector while said unique prize passes through said foreign matter detector, and wherein said controller sends a signal to said foreign matter detector that re-activates said foreign matter detector after said unique prize passes through said foreign matter detector.

36. The apparatus of claim 35 wherein said sensor is a sensor chosen from the group consisting of a capacitive proximity sensor, an inductive proximity sensor, a thickness sensor, a stiffness sensor, a color sensor, a reflectivity sensor, a transmissivity sensor, an odor sensor, and a chemical sensor.

37. The apparatus of claim 35 wherein said signal is used by said consumables packaging system to increment a counter for counting a plurality of said unique prizes as they are inserted into said packaging system wherein said counter is incremented as each said unique prize is sensed by said sensor.

38. A method for detecting a unique prize among a plurality of prizes before inserting said unique prize into a consumables packaging system wherein said unique prize is a prize that is different from other prizes within said plurality of prizes, said method comprising the following steps:

(a) sensing for a unique prize to be inserted into said consumables packaging system by an insertion device wherein said other prizes within said plurality of prizes are not sensed during said step of sensing; and (b) responsive to sensing said unique prize during said step of sensing, generating a signal for use by said consumables packaging system wherein said signal indicates that said unique prize has been detected among said plurality of objects.

39. The method of claim 38 wherein said signal is used to deactivate a foreign matter detector while said unique prize passes through said foreign matter detector.

40. The method of claim 38 wherein said signal is used to increment a counter for counting a plurality of said unique prizes.

41. The method of claim 38 wherein said step of sensing is performed using a sensor chosen from the group consisting of a capacitive proximity sensor, an inductive proximity sensor, a thickness sensor, a stiffness sensor, a color sensor, a reflectivity sensor, a transmissivity sensor, an odor sensor, and a chemical sensor.

* * * * *

UNITED STATES PATENT AND TRADEMARK OFFICE
CERTIFICATE OF CORRECTION

PATENT NO. : 6,751,935 B2 Page 1 of 2
APPLICATION NO. : 09/978975
DATED : June 22, 2004
INVENTOR(S) : Frank Mathew Brenkus It is certified that error appears in the above-identified patent and that said Letters Patent is hereby corrected as shown below:

On column 6, line 19 delete "3. The apparatus of claim 2 wherein said sensor is a capacitive proximity sensor, and said apparatus further comprising an assembly for holding said unique prize a predetermined distance from said capacitive proximity sensor as said unique prize passes by said capacitive proximity sensor.
4. The apparatus of claim 3 where said unique prize is randomly packaged in a bandolier of coupons such that each coupon in said bandolier to be inserted through said foreign matter detector passes through said assembly said predetermined distance from said capacitive proximity sensor before said coupon is inserted through said foreign matter detector and wherein said assembly comprises a plurality of rollers for positioning said coupon said predetermined distance from said capacitive proximity sensor.

5. The apparatus of claim 2 wherein said foregin matter detector is placed between a coupon inserted and a packaging device wherein said coupon inserter comprises said sensor and an insertion device for inserting said unique object into a flow of product."

On column 10, line 40 insert --42. The apparatus of claim 35 wherein said sensor is a capacitive proximity sensor, said apparatus further comprising an assembly for holding said unique prize a predetermined distance from said capacitive proximity sensor as said unique prize passes by said capactive proximity sensor.
43. The apparatus of claim 42 wherein said unique prize is randomly packaged in a bandolier of coupons such that each coupon in said bandolier to be inserted through said foreign matter detector passes through said assembly said predetermined distance from said capacitive proximity sensor before said coupon is inserted through said foreign matter detector and wherein said assembly comprises a plurality of rollers for positioning said coupon said predetermined distance from said capacitive proximity sensor.

UNITED STATES PATENT AND TRADEMARK OFFICE
CERTIFICATE OF CORRECTION

PATENT NO.       : 6,751,935 B2
APPLICATION NO.  : 09/978975
DATED            : June 22, 2004
INVENTOR(S)      : Frank Mathew Brenkus It is certified that error appears in the above-identified patent and that said Letters Patent is hereby corrected as shown below:

44. The apparatus of claim 35 wherein said foreign matter detector placed between a coupon inserter and a packaging device wherein said coupon inserter comprises said sensor and an insertion device for inserting said unique object into a flow of product.--

Signed and Sealed this

Sixth Day of November, 2007

JON W. DUDAS
*Director of the United States Patent and Trademark Office*